United States Patent [19]
Anders

[11] Patent Number: 4,979,412
[45] Date of Patent: * Dec. 25, 1990

[54] SAWING MACHINE

[76] Inventor: Johnsen Anders, Alderbäcken 35, S-781, 93 Borlänge, Sweden

[*] Notice: The portion of the term of this patent subsequent to Dec. 12, 2006 has been disclaimed.

[21] Appl. No.: 249,914

[22] PCT Filed: Jan. 22, 1988

[86] PCT No.: PCT/SE88/00021
§ 371 Date: Sep. 23, 1988
§ 102(e) Date: Sep. 23, 1988

[87] PCT Pub. No.: WO88/05369
PCT Pub. Date: Jul. 28, 1988

[30] Foreign Application Priority Data
Jan. 23, 1987 [SE] Sweden ............................. 8700255

[51] Int. Cl.$^5$ ........................... B27B 5/18; B28D 1/04
[52] U.S. Cl. ........................................ 83/397; 83/478; 83/489; 83/490; 125/14
[58] Field of Search .................... 83/397, 471.2, 471.3, 83/473, 477.1, 478, 485, 489, 490, 487, 488; 125/14; 30/388-391

[56] References Cited

U.S. PATENT DOCUMENTS

| | | | |
|---|---|---|---|
| 2,814,110 | 11/1957 | Ackley et al. | 30/388 |
| 2,996,088 | 8/1961 | Hensley | 83/490 |
| 3,323,507 | 6/1967 | Schuman | 125/14 |
| 3,722,497 | 3/1973 | Hiestand et al. | 125/14 |
| 4,318,324 | 3/1982 | Hall et al. | 83/397 |

Primary Examiner—Hien H. Phan
Assistant Examiner—Eugenia A. Jones
Attorney, Agent, or Firm—Diller, Ramik & Wight

[57] ABSTRACT

A sawing machine comprises a housing (14), an arm (3) pivotable relative to the housing about an axis (2), a member (4) on the arm, said member being arranged for connection to a saw tool and being rotatable about an axis spaced from the pivot axis of the arm and generally parallel thereto, means (19) for rotating the rotatable member and means (38) for pivoting the arm relative to the housing, there being in the housing a member (15) having an end portion (16) extending out of the housing and supporting the arm. The member (15) arranged in the housing is secured against rotation relative to the housing and the arm (3) is pivotably journalled about the end portion (16) of the member secured against rotation and extending out of the housing.

13 Claims, 6 Drawing Sheets

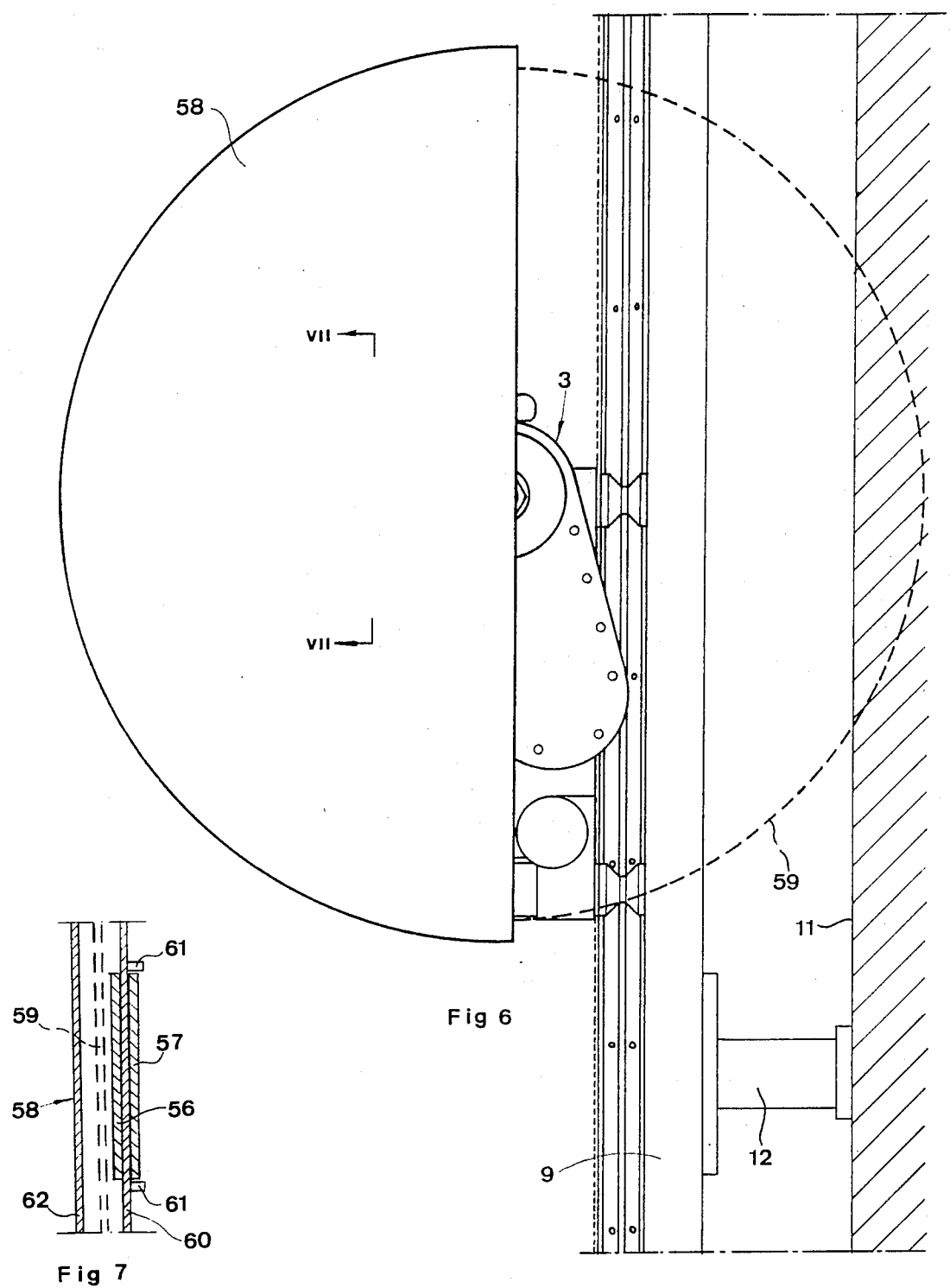

SAWING MACHINE

CROSS-REFERENCE TO RELATED APPLICATIONS

FIELD OF INVENTION AND PRIOR ART

This application includes subject matter disclosed in U.S. Pat. No. 4,885,966 issued Dec. 12, 1989.

This machine is related to a sawing machine of the kind is disclosed in U.S. Pat. No. 3,722,497. In this machine the arm is secured against rotation relative to a sleeve, within which there are means for power supply to the member supporting the saw tool in order to cause rotation of the member. The sleeve projects into the housing from a point outside the same and between the sleeve and the housing there is a bearing device for rotatably supporting the sleeve. In sawing machines of this kind the arm will be subjected to considerable stresses during the sawing work. Since the bearing device in the known machine is located between the sleeve and the housing and accordingly at a relatively large distance from the longitudinal center line of the arm, the bearing device will be subjected to considerable stresses, which cause need of robust dimensioning and thereby relatively high costs. The relatively large distance between the bearing device and the longitudinal center line of the arm causes further that a certain play in the bearing device, e.g. due to wear, will result in an even greater play as to the position of the arm, which makes it difficult to carry out exact saw cuts. Further, in the known machine a gear rim for pivoting the arm is arranged internally in the housing on the rotatable sleeve. Thus, the torque will be transferred to the arm via the rotatable sleeve and this causes additional considerable load on the bearing device of the sleeve. Finally the known machine is mechanically driven via gears arranged in the arm, which causes a relatively costly design.

SUMMARY OF THE INVENTION

The object of the present invention is to devise ways to reduce problems indicated hereinabove. In particular, the invention aims at devising a contruction which is well suitable for driving the saw tool by means of a fluid motor coordinated with the arm.

The object mentioned hereinabove is achieved according to the invention by providing the sawing machine with the features appearing from the characteristics of the appendent claims.

BRIEF DESCRIPTION OF THE DRAWINGS

With reference to the appended drawings, a more specific description of an embodiment example of the invention will follow hereinafter.

In the drawings:

FIG. 6 is a side view of the complete sawing machine including guard for the saw tool, the machine being illustrated attached to a rail and during sawing in e.g. a wall, to which the rail is secured, FIG. 7 is a cross section along the line VII—VII in FIG. 6.

DETAILED DESCRIPTION OF A PREFERRED EMBODIMENT

Figure 3:
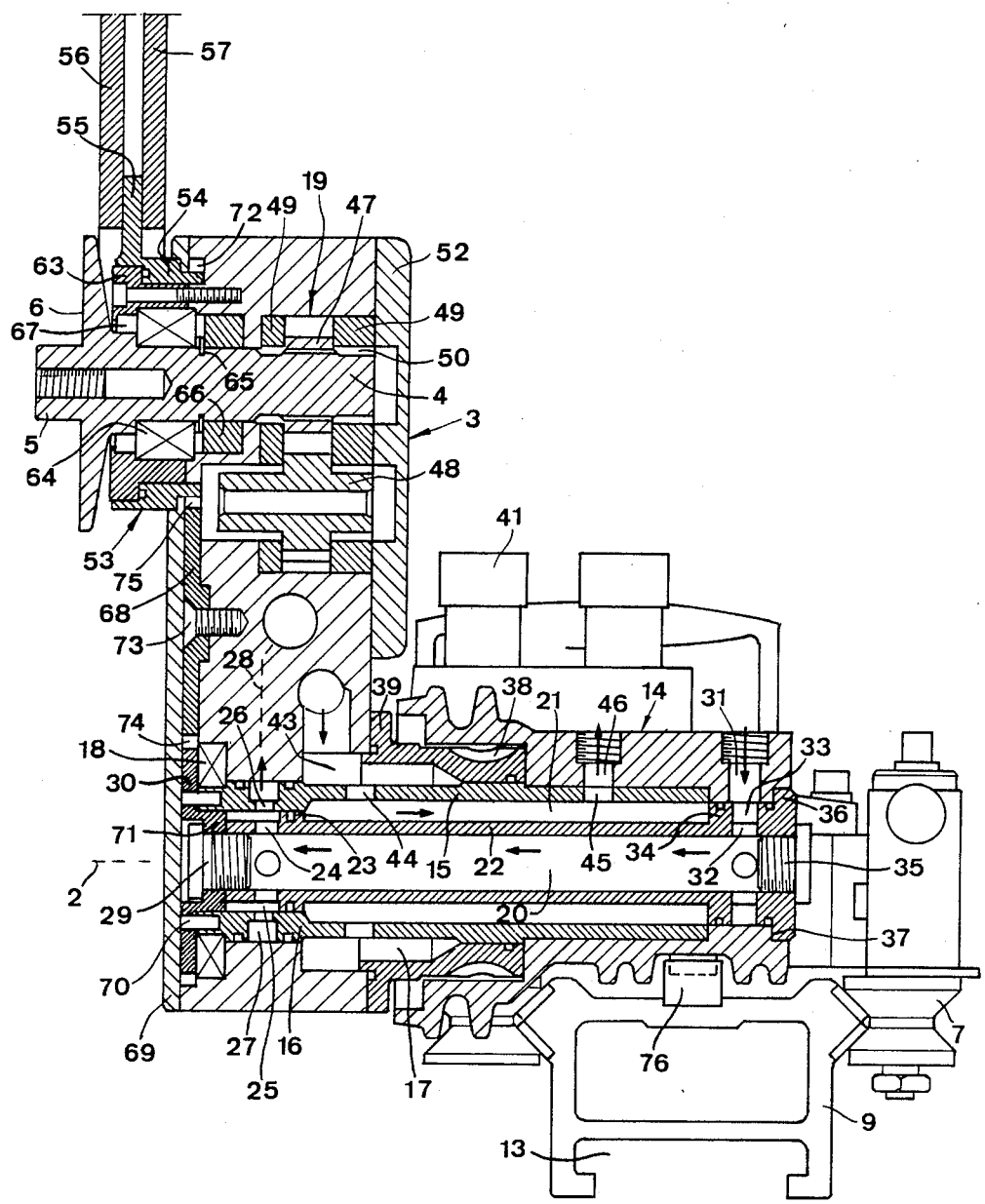
FIG. 3 is a cross section taken along the line III—III in FIG. 1, the pivotable arm of the machine being pivoted upwardly so that the section passes through and along the centre of the arm.

The sawing machine according to the invention comprises a body 1 and an arm 3 pivotable relative to the body about an axis 2. On the arm 3 (FIG. 3) a member 4 in the form of a saw spindle is arranged rotatable about an axis spaced from the pivot axis 2 of arm 3 and generally parallel thereto. The spindle 4 comprises a projection 5, to which a saw blade is securable by means of a nut or the like so that the saw blade will abut against a surface 6 on a flange of the saw spindle.

Body 1 has the character of a carriage comprising four wheels 7, 8. These wheels are intended to co-operate with a rail 9 appearing in FIGS. 3 and 6 such that the carriage 1 is displacable along the rail. As appears most clearly in FIG. 3, the rail comprises at its opposite longitudinal side edges V-shaped tracks, which converge in a direction away from each other. Wheels 7, 8 have a form complementary to the tracks and taper accordingly towards the centre so that their envelope surfaces have distinct waists. Wheels 8 are, apart from their rotational ability, stationarily arranged on carriage 1 whereas wheels 7 intended for location on the other side of rail 9 may be provided on eccentrics in such a way that one may by means of handles 10 appearing in FIG. 1 move the wheels 7 towards and away from the two other wheels 8 by rotating the eccentrics in suitable bearings provided on carriage 1. The purpose therewith is that carriage shall be removable from rail 9 in its transverse direction when wheels 7 are maximally moved away from wheels 8. It is indicated in FIG. 6 how rail 9 may be secured to an underlayer 11, e.g. a wall surface, by means of support members 12 secured to wall surface 11 by means of expansion-shell bolts or the like and comprising means projecting into the T-shaped groove 13 of rail 9 in order to connect the support members 12 to rail 9.

Figure 1:
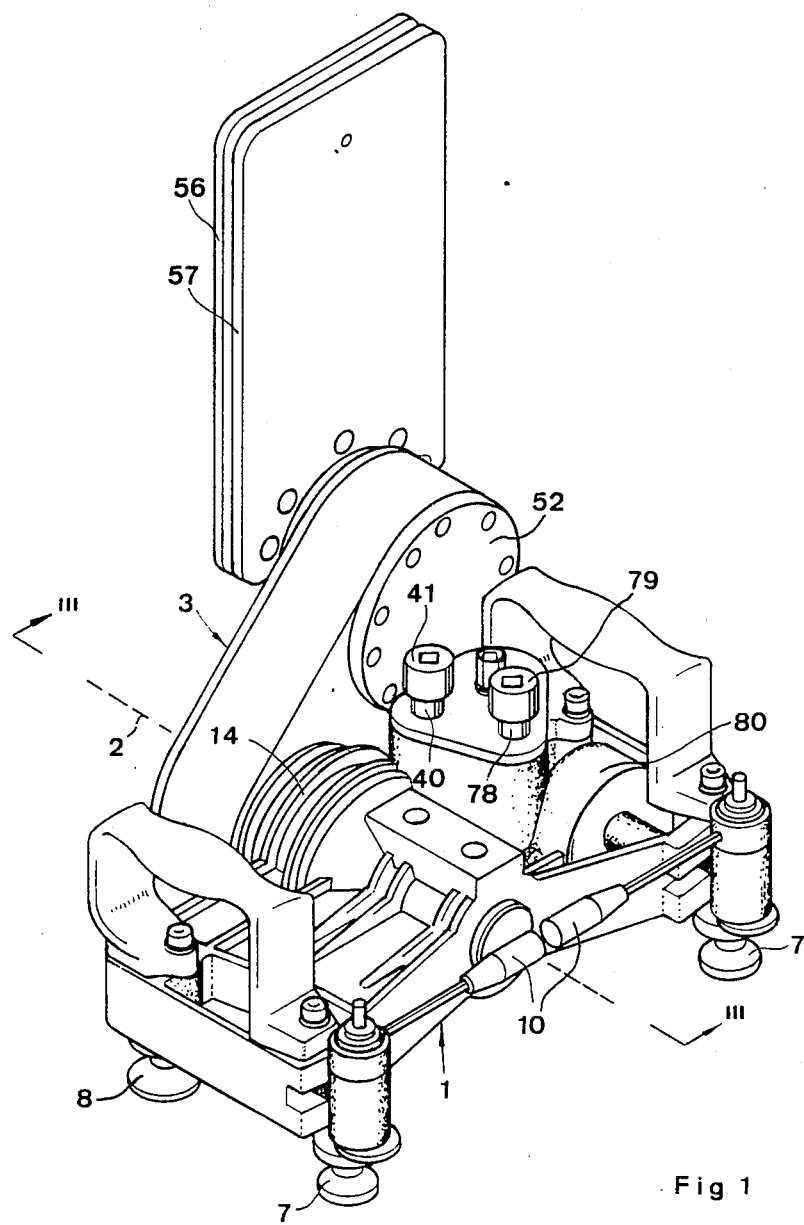
FIG. 1 is a perspective view of the sawing machine from the upper side thereof, the guard for the saw tool having been omitted.
Figure 2:
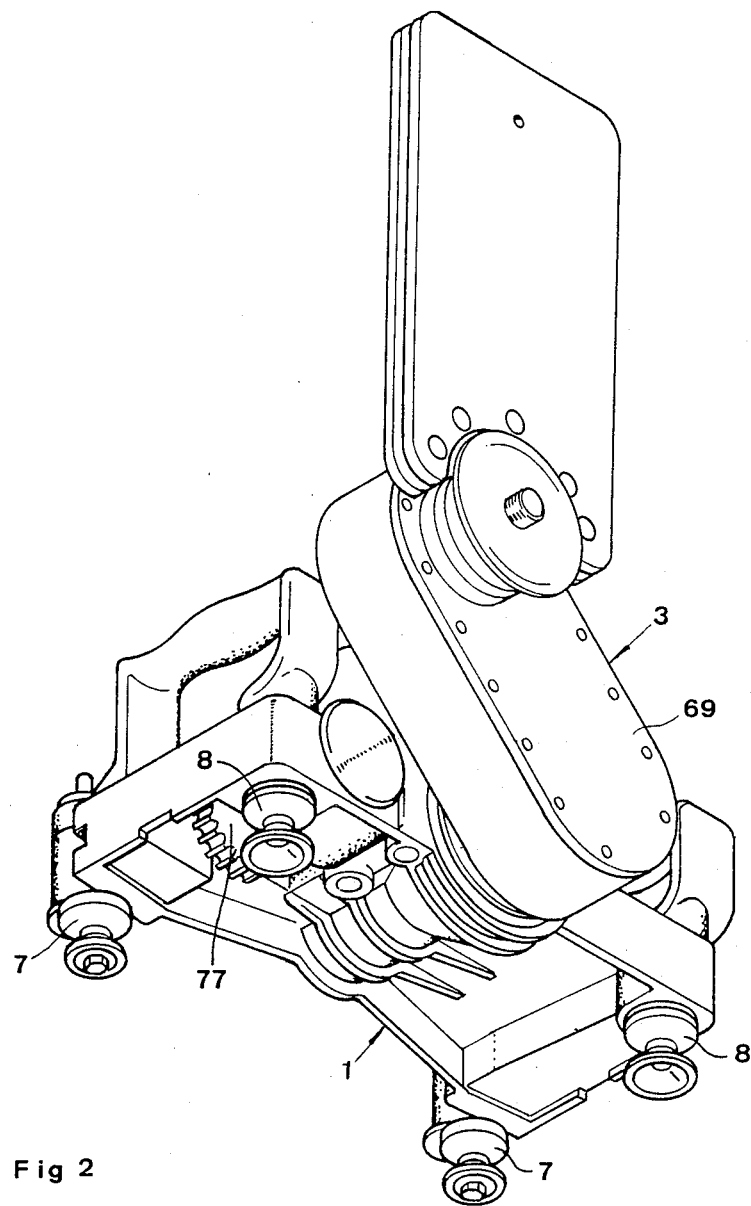
FIG. 2 is a perspective view of the sawing machine viewed in the opposite direction compared to FIG. 1.

Carriage 1 may as appears from FIGS. 1 and 2 comprise handles to simplify carrying thereof.

Carriage 1 comprises a housing 14 which may be a separate piece attached to the carriage or as in the embodiment designed in one piece with the main portion of the carriage. In housing 14 a member 15 (FIG. 3) is arranged, which has an end portion 16 projecting out of the housing through an opening 17 therein. Member 15 is secured against rotation relative to housing 14 and may e.g. be crimped or otherwise secured thereto. Arm 3 is pivotably journalled about the end portion 16 of member 15 protruding out of the housing. Thus, arm 3 comprises a recess, in which end portion 16 of member 15 is received. At least one bearing 18 may be arranged between end portion 16 of member 15 and arm 3. A pressurized fluid motor 19, e.g. a hydraulic motor, is arranged within arm 3 for rotating spindle 4.

Member 15, which accordingly has the character of shaft, is hollow and internally therein there is a channel 20 for supply of pressurized fluid to fluid motor 19. Within sleeve shaft 15, there is also a second channel 21 for discharging return fluid from motor 19. These two channels 20 and 21 are delimited from each other by means of a sleeve 22 arranged within sleeve shaft 15. Channel 20 is located internally in sleeve 22 whereas channel 21 is located externally thereof and, thus, ring-shaped. Sleeve 22 and sleeve shaft 15 adjoin sealingly to each other at 23 at the projecting end portion 16 of sleeve shaft 15. Outwardly of this sealing, sleeve 22 comprises one or more openings 24, through which fluid may flow radially outwardly to a space 25 between sleeve 22 and sleeve shaft 15 and then further radially outwardly through one or more openings 26 in sleeve shaft 15. Openings 26 may open into an annular circumferential recess in the sleeve shaft and fluid flowing thereto flows further on into a further channel 28 in arm 3. Recess 27 is on both sides surrounded by sealings acting between sleeve shaft 15 and the wall of the cavity in arm 3, which receives sleeve shaft 15. The end of sleeve 22 projecting out of housing through opening 17 is closed, e.g. by means of a plug 29. The space 25 is closed in the direction outwardly from housing 14 by means of a sealing between sleeve 22 and sleeve shaft 15 or by means of a part 30 which will be described more in detail hereinafter.

Channel 20 communicates with a fluid inlet opening 31 provided in housing 14. This opening communicates with channel 20 by one or more radial openings 32 in sleeve 22. Sleeve 22 may comprise an annular circumferential recess 33 in the area of openings 32. Sleeve 22 co-operates at 34 sealingly with an internal surface of sleeve shaft 15 or as in the embodiment, with an internal surface of housing 14. The end of sleeve 22 turned away from arm 3 is closed, e.g. by means of a plug 35. At this end sleeve 22 may comprise a radial flange 36 taking support against a shoulder 37 of the housing for limiting movement of sleeve 22 in the direction to the left in FIG. 3.

Means for pivoting arm 3 relative to body 14 comprise a gear rim 38 connected to the arm and located radially inwardly of a portion of the housing and radially outwardly of sleeve shaft 15. This gear rim is formed on an annular part 39, which is attached, e.g. by means of bolts, to arm 3. Part 39 adjoins sealingly and supporting to sleeve shaft 15. Gear rim 38 has the character of a worm wheel and is in engagement with a worm gear not illustrated and attached to an axle 40 (FIG. 1) rotatably journalled to carriage body 1 and comprising a member 41 for connection to a key, by means of which axle 40 and thereby the worm gear may be rotated so as to rotate part 39 and accordingly pivot arm 3 relative to housing 14.

Figure 4:
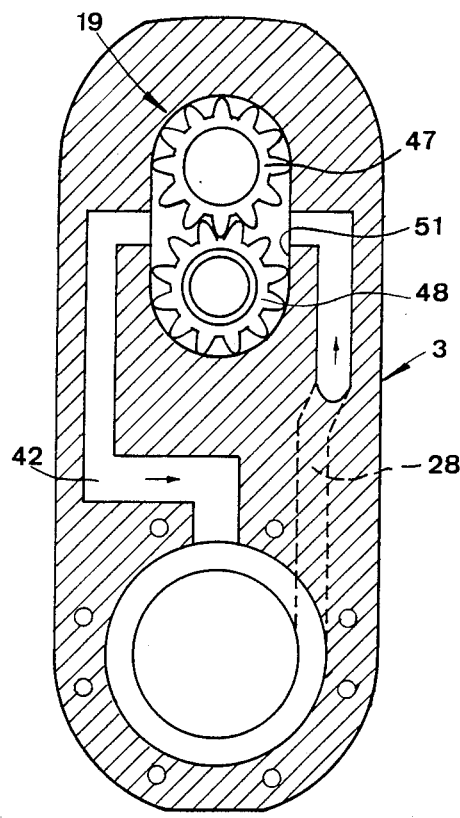
FIG. 4 is a section through the pivotable arm parallel to its plane of pivoting, it being remarked the view is highly diagrammatical and has been simplified by omitting details otherwise appearing from FIG. 3; the view illustrates the fluid motor built into the arm and the fluid supply thereof.
Figure 5:
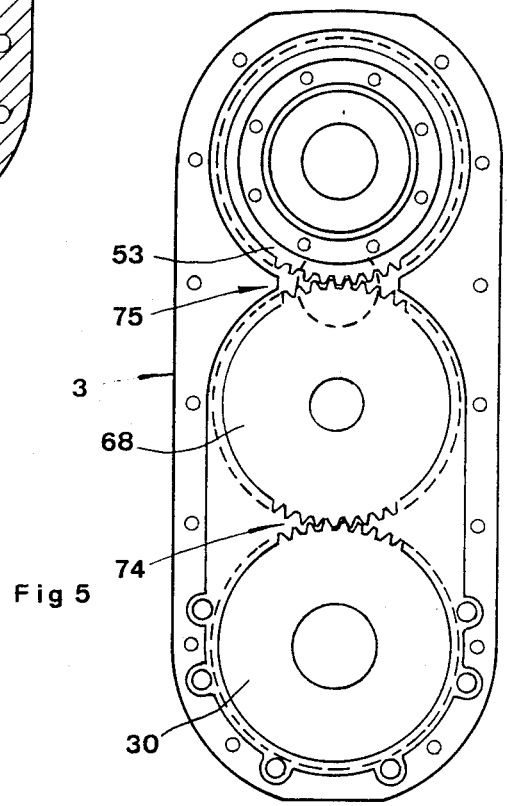
FIG. 5 is a likewise simplified and diagrammatical view illustrating co-operation between components contained in the device for rotating the rotatable element and accordingly changing the position of the guard related to the arm, the viewing direction being parallel to the pivot axis of the arm.

Return fluid from motor 19 flows via a channel 42 (FIG. 4) within arm 3 and further into an annular space 43 delimited by arm 3, sleeve shaft 15 and part 39. Sleeve shaft 15 has one or more openings 44 enabling communication between space 43 and channel 21, which via a radial opening 45 is in communication with an opening 46 for discharge of return fluid from the machine. Openings 31 and 46 are connected via suitable conduits to a pressurized fluid source.

From the above it appears that there are, between sleeve shaft 15 and arm 3, two fluid transferring connections allowing relative rotation, one for pressurized fluid supply and one for fluid return.

Fluid motor 19 is of gear type and comprises a gear 47 (see also FIG. 4) secured against rotation relative to spindle 4 by means of splines or the like. Motor 19 also comprises a second gear 48, which is in engagement with the first 47 but which only runs along freely. Gears 47 and 48 are retained sidewardly by means of plates 49. Needle bearings 50 may be provided between the extreme end of spindle 40 located remote from the location of the saw blade and the adjacent plate 49. Needle bearings are preferably also arranged between the axle portion of gear 48 and the two plates 49. Gears 47 and 48 are located in a space 51 in arm 3 and when fluid via channel 28 flows into space 51, this fluid will hit the gears in their engagement area so as to cause the gears to rotate and thus, gear 47 causes spindle 4 to rotate. The fluid then passes out of space 51 and is returned in the previously described way via channel 42 in arm 3. Space 51 is closed outwardly by means of a cover plate 52.

On arm 3 an element 53 is arranged, which comprises an annular portion 54 as well as a carrying flange 55, which is fixed to two holder plates 56, 57, which are secured to each other and carrying flange 55 by means of bolts or the like so that carrying flange 55 becomes located between the holder plates and so that these will be located mutually spaced. These holder plates are intended to hold a cover like guard 58 designed to cover for instance about half ways the saw tool 59 indicated with dashed lines in FIG. 6. The device is such that a wall 60 of guard 58 is adapted to be received between holder plates 56 and 57 as appears from the section in FIG. 7. This wall 60 of the blade guard may comprise projections 61 located at either sides of plate 57 and having the purpose to prevent movement of guard 58 perpendicularly to the longitudinal extent of plate 57. Plate 56 will be received within the cover like guard 58 and the distance between side walls 60 and 62 of the guard is such that also saw blade 59 will be received between the side walls as appears from FIG. 7. Suitable locking means, for instance screws, tension springs or the like (not illustrated in the drawings) are used for avoiding inadvertent movement of guard 58 out of the engagement with holder plates 56, 57 in their longitudinal direction.

Element 53 is rotatable relative to arm 3 for changing the position of holder plates 56, 57 and accordingly guard 58 relative to arm 3 in dependence upon the pivoting position of the arm relative to carriage 1. Element 53 is rotatable about the same axis as spindle 4 and annular portion 54 of the element surrounds spindle 4 as appears from FIG. 3. A ring 63 is by means of screws secured against rotation relative to arm 3 and acts as localizing means for rotatable element 53. Radially inside ring 63 a bearing 64 is arranged to cooperate with spindle 4. A locking ring 65 retains the bearing in place and further, there is between spindle 4 and arm 3 a sealing 66 on one side of the bearing and a further sealing 67 between spindle 4 and ring 63 on the other side of the bearing. A device for automatic rotation of element 53 and accordingly change of the position of guard 58 relative to arm 3 depending upon rotation thereof relative to carriage 1 comprises the previously mentioned part 30 secured against rotation relative to the body and located in the area of axis 2 of arm 3 and means 68 for such mechanical force transmission from this part 30 to element 53 that when arm 3 is pivoted relative to carriage 1 in a first direction the element 53 is simultaneously rotated relative to arm 3 in a direction opposite to this first direction, whereas when arm 3 is pivoted relative to carriage 1 in the other direction element 53 is simultaneously rotated relative to arm 3 in a direction opposite to said other direction. In order to always have guard 58 in a correct protective position, the device is such that when arm 3 is pivoted a certain angle relative to carriage 1 element 53 and thus guard 58 are simultaneously rotated an equally great angle relative to arm 3 in opposite direction.

Part 30 is arranged internally in the machine and more specifically within a cover plate 69 on the side of the arm facing away from housing 14. Part 30 may be said to be provided within the arm 3 proper. Part 30 comprises a circumferential gear rim and has more specifically the character of a gear, which by means of screws 70 is secured to the outer end of sleeve shaft 15. The gear has a portion 71 protruding towards housing 14 and abutting against the outer end of sleeve 22 and further adjoining sealingly to the inside of sleeve shaft 15. Plug 29 has a thread engaging with an internal thread in sleeve 22 and a widened head supporting against a shoulder on portion 71 of gear 30 on the side facing away from the end of sleeve 22 so that plug 29 tends to draw sleeve 22 towards the left in FIG. 3. Gear 30 and its gear rim are generally concentric to pivoting axis 2 of arm 3. Also element 53 comprises a gear rim 72. Transmission means 68 and gear ring 72 of element 53 are located internally in arm 3 behind cover plate 69. Transmission means 68 is in the embodiment formed by a gear, which is rotatably arranged in arm 3 about a pin 73. Gear 68 engages in the area of 74 with gear 30 and in the area of 75 with gear rim 72 of element 53. To achieve the equality discussed above as far as the size of the rotational movements between arm 3 and carriage 1 and between element 53 and arm 3 is concerned, gears 30 and 68 and gear rim 72 have equally large diameters.

Rail 9 comprises (FIG. 3) a longitudinal cog way 76. It appears from FIG. 2 that carriage 1 comprises a gear 77 adapted to co-operate with the cog way. Thus, on rotation of gear 77 carriage 1 will be displaced along rail 9. To achieve this rotation of gear 77 a worm gear engages with said gear and this worm gear is arranged on an axle 78 (FIG. 1) with suitable design or connection member 79 to be imparted a rotation by suitable key or the like. Gear 77 is in FIG. 1 located under the housing like projection 80.

When using the machine according to the invention, rail 9 is first mounted on the wall or surface to be provided with a saw cut and subsequently machine 1 is applied on the rail, arm 3 being so adjusted that the saw blade is free from the wall surface. Thereafter rotation of the blade is initiated and by pivoting arm 3 the operator may now adjust the desired depth of cut, during which adjustment blade guard 58 always will be incorrect position relative to the saw blade and wall surface without the operator having to manually readjust the guard. Thereafter the operator displaces the machine along rail 9 while a saw cut is being made in the wall surface.

POSSIBLE MODIFICATIONS OF THE INVENTION

Figure 8:
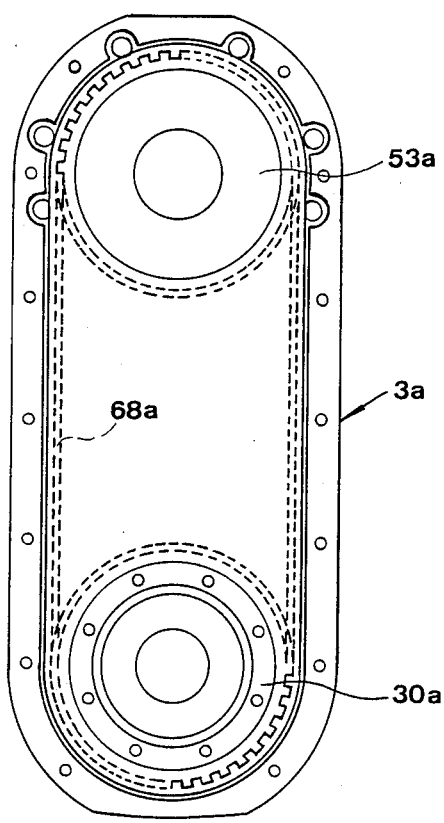
FIG. 8 is a view similar to FIG. 5 but illustrating an alternative embodiment.

It is evident that the sawing machine may be modified in several ways within the scope of the invention. Instead of using transmission means 68 in the form of a gear it would be possible to put a chain around gear 30 and gear rim 72 of element 53. Instead of a chain it would be possible to use e.g. a toothed belt, which is illustrated in FIG. 8 at 68a, the wheels being formed by toothed wheels 30a and 53a. For the rest, it is not necessary that part 30 is designed as a gear or toothed wheel. Part 30 could instead have the character of a drum, pulley, rope disc or the like secured against rotation relative to the body and adapted for co-operation with a flexible traction force transmitting element in the form of a rope, line or V-belt. In analogical way, the rotatable element 53 would in such a case not have any gear rim but instead a corresponding drum, pulley or rope disc. In these latter cases some slippage in the transmission could occur in case the guard accidentally would hit any hindrance, a fact which possibly could be an advantage even if such embodiments could necessitate adjustments of the position of the rotatable element 53. For the rest, wheels 30, 68 and 53 could be arranged to engage mutually for force transmission by friction instead of by meshing engagement. The above described design of the sawing machine is preferable since it enables unlimited rotation of the arm turn after turn relative to the body. However, it would also be possible to design the machine so that arm 3 was only limitedly pivotable or rotatable relative to the body, e.g. in an angle of 360° or less.

I claim:
1. A sawing machine comprising a body (1), an arm (3) pivotable relative to the body about an axis (2), a member (4) on the arm, said member being arranged for connection to a saw tool (59) and being rotatable about an axis spaced from the pivot axis of the arm and generally parallel thereto, a motor (19) for rotating the rotatable member (4), means (40, 38) for pivoting the arm (3) relative to the body (1), said body comprising a housing (14) with a member (15) arranged thereat, said member (15) having a portion (16) extending out of the housing and supporting the arm, the member (15) arranged at the housing (14) is secured against rotation relative to the housing, the arm (3) being pivotably journalled about the portion (16) of the member (15) secured against rotation extending away from the housing (14), the motor (19) being a fluid motor coordinated with the arm (3), there being a channel (20) internally in the member (15) secured against rotation for supply of fluid to the fluid motor (19), the member (15) secured against rotation comprising at least one hole (26) for transferring fluid from said channel (20) to a further channel (28) in the arm, and within said member (15) secured against rotation there being a second channel (21) for receiving return fluid from the fluid motor (19).

2. A sawing machine according to claim 1, characterized in that said means for pivoting the arm (3) relative to the body (1) comprise a gear rim (38) provided on the arm and located radially within a portion of the housing (14) and radially outside the member 15 secured against rotation.

3. A sawing machine according to claim 2, characterized in that the gear rim (38) is arranged on a part (39) rigidly connected to the arm (3), said part (39) extends into the housing (14) through an opening (17) therein and is supported radially by the external surface of said member (15), and said member (15) is secured against rotation relative to said housing 14.

4. A sawing machine according to claim 1, characterized in that the hole (26) in the member (15) secured against rotation is arranged in an end portion thereof opposite to the arm (3).

5. A sawing machine according to claim 1 characterized in that the member (15) secured against rotation is hollow and internally is provided with a sleeve (22), which with its internal cavity participates in forming the first mentioned channel (20) and which between itself and the member (15) secured against rotation forms the second channel (21) for discharging return fluid from the motor, that the sleeve (22) and the member (15) secured against rotation sealingly adjoin to each other (at 23) to separate the first and second channels (20, 21) from each other, that the sleeve (22) comprises at least one opening (24) for allowing pressurized fluid to flow from its internal cavity to the hole (26) of the member (15) secured against rotation, that the member (15) secured against rotation comprises at least one second hole (44) for entrance of return fluid from a return fluid channel (42) in the arm, that said sealing adjoining (at 23) between the sleeve (22) and the member (15) secured against rotation is located in the area between the holes (26, 44), which are axially spaced, in the member (15) secured against rotation and that also the member (15) secured against rotation and the arm (3) adjoin sealingly relative to each other in the area between these holes.

6. A sawing machine according to claim 1, characterized in that the fluid motor (19) is built into a space (51) in the arm and that a wheel (47) rotatable by means of pressurized fluid is secured against rotation relative to the rotatable member (4).

7. A sawing machine according to claim 2 comprising an element (53) rotatably arranged on the arm and adapted to be connected to a guard (58) for the saw tool, and a device comprising force transmission means (68, 68a) and arranged for automatic rotation of the element (53) and thereby change of the position of the guard (58) relative to the arm (3) in dependence upon pivoting of the arm relative to the body so that when the arm (3) is pivoted relative to the body in a first direction the rotatable element is simultaneously rotated relative to the arm in a direction opposite to this first direction, whereas when the arm is pivoted relative to the body in the other direction the rotatable element is simultaneously rotated relative to the arm in a direction opposite to said other direction, characterized in that the device for rotating the element (53) and change of the position of the guard (58) relative to the arm (3) comprises a part (30) secured against rotation relative to the body, located in the area of the pivot axis (2) of the arm and being generally concentric thereto, and that said force transmission means for transmitting forces from the part (30) secured against rotation relative to the body to the rotatable element (53) for rotation thereof on pivoting of the arm comprise at least one force transmitting element (68a, 68).

8. A sawing machine according to claim 7, characterized in that the part (30) secured against rotation relative to the body is connected to an end portion of the member (15) secured against rotation relative to the housing.

9. A sawing machine according to claim 7 characterized in that the part (30) secured against rotation relative to the body is arranged internally in the machine and that said force transmitting element (68, 68a) and a part of the rotatable element (53) in engagement therewith are located internally in the arm (3).

10. A sawing machine according to claim 7 characterized in that the part (3) secured against rotation relative to the body and the element (53) rotatably arranged on the arm each comprises a gear rim, said gear rims being in indirect force transmitting connection to each other via said force transmitting element which comprises a gear rim.

11. A sawing machine according to claim 1 wherein the body (1) has the character of a carriage displaceable along a rail (9) mountable on a surface, said arm being adapted to adjust said saw tool for making a saw cut in the surface on displacement of the body along the rail.

12. A sawing machine according to claim 1 wherein the arm is unlimitedly rotatable turn after turn relative to the body (1).

13. A sawing machine according to claim 11 wherein the arm is unlimitedly rotatable turn after turn relative to the body (1).

* * * * *

UNITED STATES PATENT AND TRADEMARK OFFICE
CERTIFICATE OF CORRECTION

PATENT NO. : 4,979,412

DATED : December 25, 1990

INVENTOR(S) : Johnsen Anders

It is certified that error appears in the above-identified patent and that said Letters Patent is hereby corrected as shown below:

On the title page, item [19] "Anders" should read --Johnsen--; and item [76] Inventor: "Johnsen Anders" should read --Anders Johnsen--.

Signed and Sealed this

Fourteenth Day of July, 1992

Attest:

DOUGLAS B. COMER

*Attesting Officer*    *Acting Commissioner of Patents and Trademarks*